US010059536B2

(12) United States Patent
Tomioka et al.

(10) Patent No.: US 10,059,536 B2
(45) Date of Patent: Aug. 28, 2018

(54) PARTICULATE MATERIAL SUPPLYING APPARATUS WITH A DOWNWARDLY SLANTING DISCHARGE GUTTER WHICH ROTATES SIDE TO SIDE

(71) Applicant: SANKO MACHINERY CO., LTD., Sagamihara-shi, Kanagawa (JP)

(72) Inventors: Takahito Tomioka, Sagamihara (JP); Tatuya Sakamoto, Sagamihara (JP); Hisao Ueda, Sagamihara (JP)

(73) Assignee: SANKO MACHINERY CO., LTD., Sagamihara-shi (JP)

( * ) Notice: Subject to any disclaimer, the term of this patent is extended or adjusted under 35 U.S.C. 154(b) by 392 days.

(21) Appl. No.: 14/857,441

(22) Filed: Sep. 17, 2015

(65) Prior Publication Data
US 2016/0075525 A1    Mar. 17, 2016

Related U.S. Application Data

(63) Continuation of application No. 13/968,715, filed on Aug. 16, 2013.

(30) Foreign Application Priority Data

Aug. 16, 2012  (JP) ................................ 2012-180387
Sep. 27, 2012  (JP) ................................ 2012-214293

(51) Int. Cl.
*B65G 65/48*      (2006.01)
*B01F 15/02*      (2006.01)
(Continued)

(52) U.S. Cl.
CPC ........ *B65G 65/489* (2013.01); *B01F 15/0253* (2013.01); *B65B 1/32* (2013.01);
(Continued)

(58) Field of Classification Search
CPC ...... B65G 65/489; B65G 69/10; B65G 47/50; B65G 27/04; B65B 37/08; B65B 37/18;
(Continued)

(56) References Cited

U.S. PATENT DOCUMENTS 2,905,311 A * 9/1959 Augusto Marchetti
................................. B65G 69/00
198/861.6
4,171,948 A * 10/1979 Kraus ..................... C21L 33/08
266/232
4,503,783 A * 3/1985 Musschoot ................ F23J 1/00
110/165 R
4,842,124 A * 6/1989 Musschoot ........ B65G 69/0441
198/360
(Continued)

FOREIGN PATENT DOCUMENTS

CA      2749623 A1 *  2/2013  ............. B65G 27/04
EP      0878695 A2    11/1998
(Continued)

*Primary Examiner* — Charles Cooley
(74) *Attorney, Agent, or Firm* — Westerman, Hattori, Daniels & Adrian

(57) ABSTRACT

A particulate material supplying apparatus includes a hopper that stores a particulate material, a discharge gutter that dispenses the particulate material, a feeder that transports the particulate material to a weighing scale, the weighing scale that weighs the particulate material, a supply shutter that feeds the particulate material to a machine in the next process step at a predetermined timing, and a controller that controls the operations of these devices. The discharge gutter includes an inclined gutter portion having an opening in an upper surface thereof and a substantially U-shaped cross section. The controller controls the discharge gutter so that the particulate material in the hopper is dispensed to the feeder by causing the discharge gutter to perform a swinging motion in which a forward rotation and a backward rotation each to a predetermined angle are repeated while the opening in the inclined gutter portion faces upward.

9 Claims, 16 Drawing Sheets

(51) Int. Cl.
*B65B 37/04* (2006.01)
*B65B 1/32* (2006.01)
*B65B 37/08* (2006.01)
*B65B 37/18* (2006.01)
*G01G 13/16* (2006.01)
*B65G 27/04* (2006.01)
*B65G 47/50* (2006.01)
*B65G 69/10* (2006.01)

(52) U.S. Cl.
CPC .............. *B65B 37/04* (2013.01); *B65B 37/08* (2013.01); *B65B 37/18* (2013.01); *B65G 27/04* (2013.01); *B65G 47/50* (2013.01); *B65G 69/10* (2013.01); *G01G 13/16* (2013.01)

(58) Field of Classification Search
CPC .......... B65B 37/04; B65B 1/32; G01G 13/16; B01F 15/0253
USPC ...................................................... 198/631.1
See application file for complete search history.

(56) References Cited

U.S. PATENT DOCUMENTS

| | | | | |
|---|---|---|---|---|
| 4,846,676 A | * | 7/1989 | Mathis | B65G 69/0441 198/535 |
| 2014/0048172 A1 | * | 2/2014 | Tomioka | B65B 1/32 141/83 |
| 2014/0299633 A1 | * | 10/2014 | Nohmi | B65G 65/489 222/333 |
| 2016/0075525 A1 | * | 3/2016 | Tomioka | B65B 1/32 414/21 |
| 2017/0113825 A1 | * | 4/2017 | Naoi | B65B 51/26 |

FOREIGN PATENT DOCUMENTS

| | | | | |
|---|---|---|---|---|
| JP | 08-226845 A | | 9/1996 | |
| JP | 2013095516 A | * | 5/2013 | ........... B65G 65/489 |
| JP | 2014055066 A | * | 3/2014 | ............... B65B 1/32 |
| WO | 00/73748 A1 | | 12/2000 | |

* cited by examiner

U-SHAPED DISCHARGE GUTTER
(HOME POSITION)

U-SHAPED DISCHARGE GUTTER
(RIGHTWARD ROTATED POSITION)

U-SHAPED DISCHARGE GUTTER
(LEFTWARD ROTATED POSITION)

FIG. 10
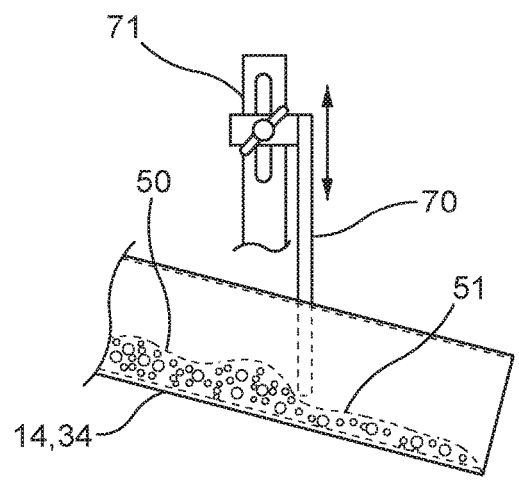
FIG. 11A
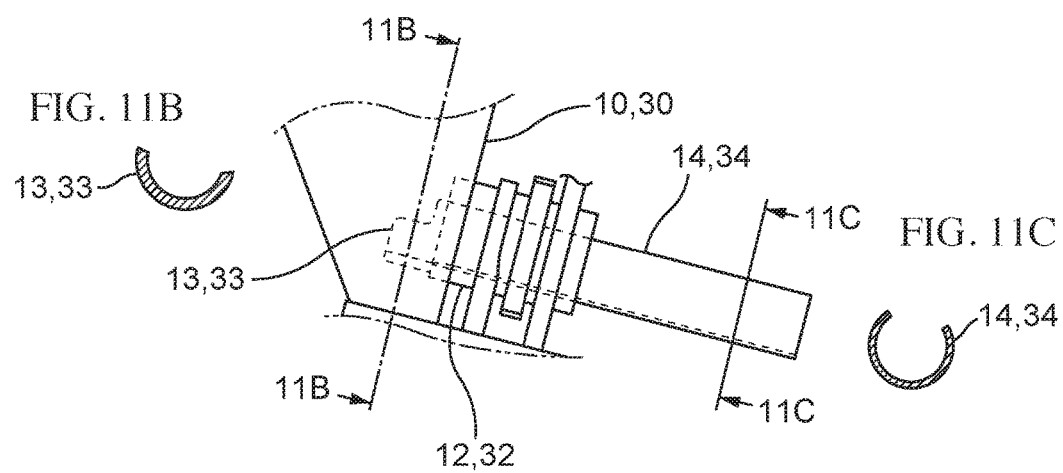
FIG. 11B
FIG. 11C

PARTICULATE MATERIAL SUPPLYING APPARATUS WITH A DOWNWARDLY SLANTING DISCHARGE GUTTER WHICH ROTATES SIDE TO SIDE

BACKGROUND OF THE INVENTION

1. Field of the Invention

The present invention relates to the technical field of automatic packaging machines that automatically package a material (contents) in a film bag (packaging material). In particular, the present invention relates to a particulate material supplying apparatus that is capable of supplying a specified amount of a particulate material composed of irregularly shaped particles to an automatic packaging machine.

2. Description of the Related Art

Existing automatic packaging machines automatically package a particulate material (contents) as follows: the material is temporarily stored in a hopper of the automatic packaging machine, the material is weighed and divided into portions having predetermined weights while bags are being formed, the portions of the material are put into the bags through openings in the bags, the openings are sealed (heat sealed), and the bags are separated into individual packages.

Japanese Unexamined Patent Application Publication No. 8-226845 describes an existing particulate material supplying apparatus for weighing a particulate material composed of irregularly shaped particles, such as seeds of plants and ingredients of processed foods, and for supplying the particulate material to an automatic packaging machine. The particulate material supplying apparatus has the following structure. A material is discharged from a discharge portion of a hopper; the material is continuously dispensed through a dispensing pipe, which is inclined downward and rotated by rotation means in one direction, into a receiving member; and the material is weighed by a weighing scale. When the weight of the material reaches a predetermined value, opening/closing means opens a cover of the receiving member, and the weighed material is discharged. The Publication states that, with such a structure, the weighed object (material) can be dispensed accurately in predetermined amounts, and therefore it is possible to prevent an increase in cost and man-hours for disposal of erroneously packaged products, which may occur when the material is packaged in excessively large or small amounts.

SUMMARY OF THE INVENTION

However, such an existing particulate material supplying apparatus has the following problem. That is, because a particulate material composed of irregularly shaped particles is dispensed by means of rotation in one direction and the downward inclination of the dispensing pipe, the apparatus cannot sufficiently loosen the particles of a particulate material that tend to cluster together or become entangled. Therefore, the particulate material is dispensed in a state in which its particles are clustered or entangled, so that the dispensed amount varies.

The present invention provides a particulate material supplying apparatus that is capable of supplying a particulate material whose particles tend to cluster together or become entangled, which is difficult to dispense by using existing particulate material supplying apparatuses, to an automatic packaging machine in a predetermined amount.

(1) According to a first aspect of the present invention, a particulate material supplying apparatus includes a hopper that stores a particulate material; a discharge gutter that extends diagonally downward from a lower region inside the hopper and dispenses the particulate material in the hopper; a feeder that transports the dispensed particulate material to a weighing scale; the weighing scale that receives and weighs the transported particulate material; a supply shutter that receives the weighed particulate material and feeds the particulate material to a machine in the next process step at a predetermined timing; and a controller that controls a dispensing operation of the discharge gutter, a transporting operation of the feeder, a weighing operation of the weighing scale, and a feeding operation of the supply shutter. The discharge gutter includes an inclined gutter portion having an opening in an upper surface thereof and having a substantially U-shaped cross section. The controller controls the discharge gutter so that the particulate material in the hopper is dispensed to the feeder by causing the discharge gutter to perform a swinging motion in which a forward rotation and a backward rotation each to a predetermined angle are repeated while the opening in the inclined gutter portion faces upward.

With the particulate material supplying apparatus described in (1), the particles of a particulate material that tend to cluster together or become entangled are sufficiently loosened, because the inclined gutter portion of the discharge gutter, having an opening in an upper surface thereof and having a substantially U-shaped cross section, performs a swinging motion in which a forward rotation and a backward rotation each to a predetermined angle are repeated. That is, when the discharge gutter swings by switching its rotation direction, a horizontal stirring force at an angle of 90 degrees with respect to the transport direction is applied to the material, and therefore the particles of a particulate material that tend to cluster together or become entangled are separated from each other and sufficiently loosened.

(2) According to a second aspect of the present invention, a particulate material supplying apparatus includes a hopper that stores a particulate material; a plurality of discharge gutters that extend diagonally downward from a lower region inside the hopper and dispense the particulate material in the hopper; a plurality of feeders that transport the dispensed particulate material to a plurality of weighing scales; the plurality of weighing scales that receive and weigh the transported particulate material; a plurality of supply shutters that receive the weighed particulate material and feed the particulate material to a collective shutter; a collective shutter that receives the particulate material fed from the supply shutters and collectively feeds the particulate material to a machine in the next process step at a predetermined timing; and a controller that controls dispensing operations of the discharge gutters, transporting operations of the feeders, weighing operations of the weighing scales, feeding operations of the supply shutters, and a collective feeding operation of the collective shutter. The discharge gutters each include an inclined gutter portion having an opening in an upper surface thereof and having a substantially U-shaped cross section. The controller controls the discharge gutters so that the particulate material in the hopper is dispensed to the feeders by causing each of the discharge gutters to perform a swinging motion in which a forward rotation and a backward rotation each to a predetermined angle are repeated while the openings in the inclined gutter portions face upward. The controller controls the weighing scales so that the weighing scales receive the particulate material transported by the feeders and perform the weighing operations until a weight of the transported particulate material reaches a reference value determined for each of the weighing scales. The controller controls the supply shutters so that the supply shutters feed the particulate material to the collective shutter at release timings determined for the supply shutters. The controller controls the collective shutter so that the collective shutter collectively feeds the particulate material to the machine in the next process step at a predetermined feed timing after a total weight of the particulate material fed from the supply shutters has reached a predetermined weight of material to be packed into a package bag.

With the particulate material supplying apparatus described in (2), the following effect can be obtained in addition to that of the apparatus described in (1): because the apparatus includes the discharge gutters, the feeders, the weighing scales, and the supply shutters, which are parallelly arranged in rows and are operated simultaneously, and the weighed particulate material fed from the plurality of rows are collectively fed to a machine in the next process step, the time required for supplying the material can be reduced in accordance with the number of rows.

(3) The particulate material supplying apparatus may further include a discharge member that is disposed in the hopper and connected to the discharge gutter and that first dispenses the particulate material. The discharge member is provided with a stirring bar that stirs the particulate material in the hopper as the discharge gutter performs the swinging motion.

Because the stirring bar of the discharge member of the particulate material supplying apparatus described in (3) stirs the particulate material in the hopper as the discharge gutter performs the swinging motion, a larger amount of particulate material can be smoothly dispensed from the hopper to the discharge gutter.

(4) The particulate material supplying apparatus may further include a material regulation bar that extends into the inclined gutter portion of the discharge gutter through the opening, the material regulation bar being supported by a base of the particulate material supplying apparatus in such a way that a vertical position thereof is adjustable. The material regulation bar levels off the particulate material in the discharge gutter and stirs the particulate material.

The material regulation bar of the discharge gutter particulate material supplying apparatus described in (4) levels off the particulate material in the discharge gutter and stirs the particulate material. Therefore, the particles of particulate material that tend to cluster together or become entangled can be more efficiently loosened.

(5) In the particulate material supplying apparatus, the feeder may include a trough that receives the dispensed particulate material from the discharge gutter and transports the particulate material and a vibrator that vibrates the trough to provide means for transporting the particulate material. The trough includes at least one stepped portion that accelerates the particulate material that is being transported along the trough.

The stepped portion of the trough of the feeder described in (5) accelerates the particulate material that is being transported along the trough. Therefore, gaps formed between particles of the particulate material when the particles were loosened can be substantially eliminated.

(6) According to a third aspect of the present invention, a particulate material supplying apparatus includes a hopper that stores a particulate material; a discharge gutter that extends diagonally downward from a lower region inside the hopper and dispenses the particulate material in the hopper; a weighing scale that receives and weighs the dispensed particulate material; a supply shutter that receives the weighed particulate material and feeds the particulate material to a machine in the next process step at a predetermined timing; and a controller that controls a dispensing operation of the discharge gutter, a weighing operation of the weighing scale, and a feeding operation of the supply shutter. The discharge gutter includes an inclined gutter portion having an opening in an upper surface thereof and having a substantially U-shaped cross section. The controller controls the discharge gutter so that the particulate material in the hopper is dispensed to the weighing scale by causing the discharge gutter to perform a swinging motion in which a forward rotation and a backward rotation each to a predetermined angle are repeated while the opening in the inclined gutter portion faces upward.

With the particulate material supplying apparatus described in (6), the particles of a particulate material that tend to cluster together or become entangled are sufficiently loosened, because the inclined gutter portion of the discharge gutter, having an opening in an upper surface thereof and having a substantially U-shaped cross section, performs a swinging motion in which a forward rotation and a backward rotation each to a predetermined angle are repeated. Moreover, because the feeder is omitted, the particulate material supplying apparatus can be reduced in size and cost.

As described above, the particulate material supplying apparatus according to the present invention has the following advantages.

(1) The particulate material supplying apparatus can supply an accurate amount of particulate material whose particles tend to cluster together or become entangled, which is difficult to dispense using existing technologies, to an automatic packaging machine by sufficiently loosening the particles of the particulate material.

(2) Because of a simple structure, the particulate material supplying apparatus can be manufactured at low cost. Moreover, in the case where the particulate material supplying apparatus includes plural supply mechanisms that are parallelly arranged, the particulate material can be supplied at high speed. Therefore, the particulate material supplying apparatus can be connected to a latest-type automatic packaging machine that operates at a high speed.

BRIEF DESCRIPTION OF THE DRAWINGS

FIG. 10 is a schematic side view of a particulate material supplying apparatus according to an embodiment of the present invention, further including a material regulation bar disposed in the discharge gutter;

FIG. 11A is an enlarged view illustrating a discharge member and a discharge gutter of the particulate material supplying apparatus according to an embodiment of the present invention; FIG. 11B is a sectional view of the discharge member; and FIG. 11C is a sectional view of the discharge gutter.

DESCRIPTION OF THE PREFERRED EMBODIMENTS

Figure 1:
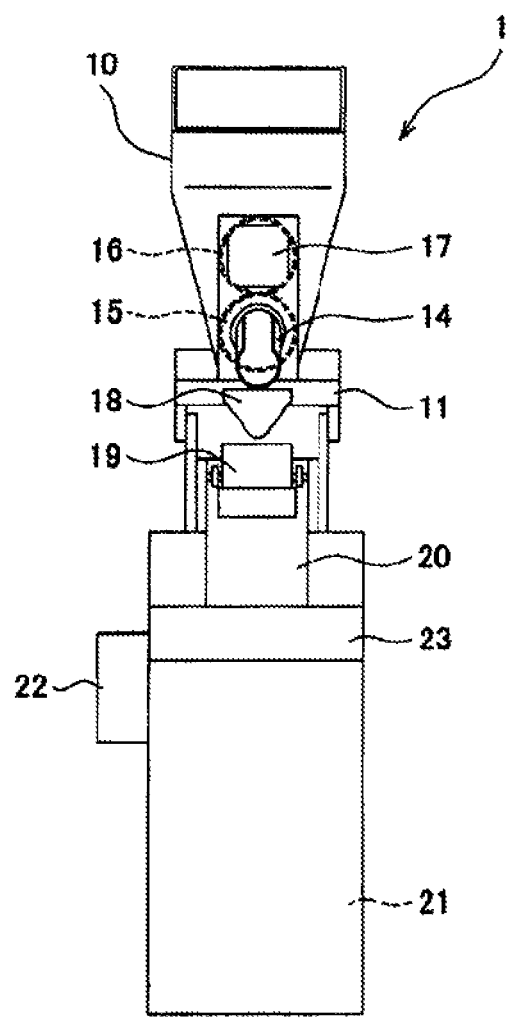
FIG. 1 is a front view of a single-row particulate material supplying apparatus according to an embodiment of the present invention.
Figure 2:
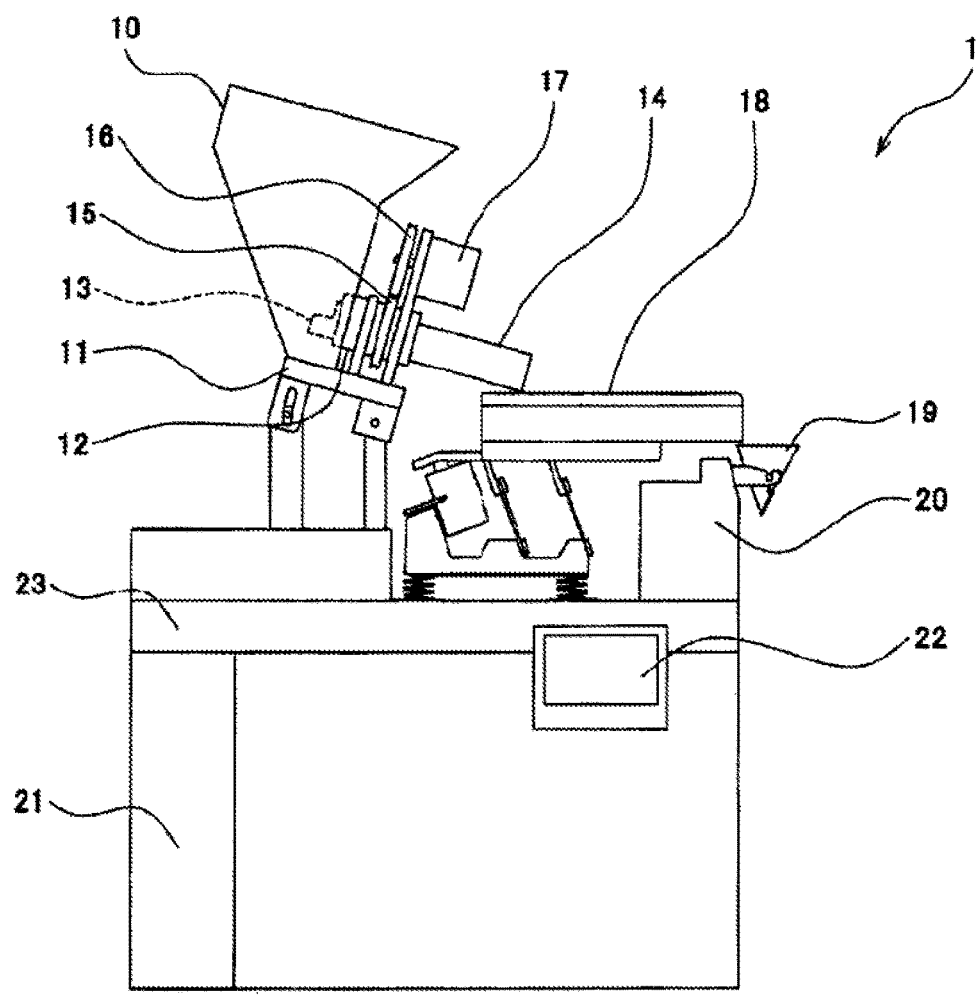
FIG. 2 is a left side view of the single-row particulate material supplying apparatus.

Hereinafter, embodiments of a particulate material supplying apparatus according to the present invention will be described with reference to the drawings. First, the structure of a single-row particulate material supplying apparatus 1 according to an embodiment of the present invention will be described. FIG. 1 is a front view of the single-row particulate material supplying apparatus 1. FIG. 2 is a left side view of the single-row particulate material supplying apparatus 1. Referring to FIGS. 1 and 2, the single-row particulate material supplying apparatus 1 includes a hopper 10, an inclination adjustment base 11, a discharge member 13, and a discharge gutter 14. The hopper 10 stores a particulate material composed of irregularly shaped particles. The inclination adjustment base 11 supports the hopper 10 in such a way that the inclination of the hopper 10 is adjustable. The discharge member 13 (not illustrated in FIG. 1, see FIG. 2), which is disposed in a lower region inside the hopper 10, first dispenses the particulate material in the hopper 10. The discharge gutter 14 moves together with the discharge member 13 and transports the particulate material while dispensing the particulate material in the hopper 10.

The discharge gutter 14 includes an inclined gutter portion having a substantially U-shaped cross section and having an opening in an upper surface thereof. The discharge gutter 14 is connected to the discharge member 13 through a connection member 12. A gutter-side transmission gear 15 is fitted onto the discharge gutter 14. A motor-side transmission gear 16 is attached to a driving motor 17, which rotates the discharge gutter 14 to a predetermined angle. The transmission gears 15 and 16 mesh with each other.

A feeder 18 is disposed directly below an outlet of the inclined gutter portion the discharge gutter 14. The feeder 18 transports the particulate material, which has been received from the discharge gutter 14, rightward in FIG. 2 by means of vibration while diffusing the particulate material. A supply shutter 19 is disposed directly below an outlet of the feeder 18. The supply shutter 19 is connected to a weighing scale 20 so that the weighing scale 20 can weigh the particulate material which has fallen into the supply shutter 19. The members described above are mounted on a base 23. A controller 21 and an operation panel 22 are disposed under the base 23. The controller 21 performs various control operations of the particulate material supplying apparatus 1. The operation panel 22 is used to perform various input/output operations on the controller 21.

An operation of the single-row particulate material supplying apparatus 1, which is illustrated in FIGS. 1 and 2, will be described.

(1) A particulate material composed of irregularly shaped particles (not shown) is stored in the hopper 10. The particulate material in the hopper 10 is compressed in a lower region inside the hopper 10 due to gravity.

(2) The motion of the discharge gutter 14 will be described. The gutter-side transmission gear 15 (described above) is fitted onto a base portion of the discharge gutter 14. The motor-side transmission gear 16 meshes with the gutter-side transmission gear 15, so that the rotational force of the driving motor 17 is transmitted to the discharge gutter 14. When the driving motor 17 rotates the motor-side transmission gear 16 leftward (counterclockwise) in FIG. 1, the gutter-side transmission gear 15 rotates the discharge gutter 14 rightward (clockwise) (hereinafter referred to as "forward"). When the driving motor 17 rotates the motor-side transmission gear 16 rightward, the gutter-side transmission gear 15 rotates the discharge gutter 14 leftward (hereinafter referred to as "backward"). Under the control of the controller 21, the driving motor 17 rotates leftward to a predetermined angle, then rotates rightward to a predetermined angle, and repeats the leftward and rightward rotations. Likewise, the discharge gutter 14, which is connected to the driving motor 17 through gears, rotates forward to a predetermined angle, then rotates backward to a predetermined angle, and repeats the forward and backward rotations. Thus, the discharge gutter 14 performs a swinging motion. As a result, when the discharge gutter 14 swings by switching its rotation direction, a horizontal stirring force at an angle of 90 degrees with respect to the transport direction is applied to the material, and therefore the particles of a particulate material that tend to cluster together or become entangled are separated from each other and sufficiently loosened.

(3) Because the inclined gutter portion of the discharge gutter 14 has an opening in the upper surface and has a substantially U-shaped cross section, the rightward (forward) and leftward (backward) rotation angles of the discharge gutter 14 are set in a range such that the particulate material does not fall out from the opening. In addition to the rotation angle of the discharge gutter 14, the rotational speeds of the discharge gutter 14 in the forward and backward directions and the inclination angle of the discharge gutter 14, which is adjusted using the inclination adjustment base 11, are factors that determine the loosening effect due to the swinging motion. That is, the larger the rotation angle of the discharge gutter 14 and higher the rotational speed of the discharge gutter 14, the more the particles of the particulate material are loosened. The smaller the inclination angle of the discharge gutter 14, the more the particles of the particulate material are loosened, because the number of swings increases although the transportation amount of the particulate material decreases.

(4) As the discharge gutter 14 moves, the discharge member 13, which is connected to the discharge gutter 14 through the connection member 12, performs a swinging motion (forward and backward rotations) in the hopper 10. Thus, the particulate material in the hopper 10 is dispensed to the discharge gutter 14. As the discharge gutter 14 performs a swinging motion in forward and backward directions as described above in (2) and (3), the particles of the particulate material dispensed to the discharge gutter 14 are sufficiently loosened. After the particles have been separated from each other, the particulate material is supplied to the feeder 18.

(5) The feeder 18 further diffuses the particulate material received from the discharge gutter 14 and causes the particulate material to gradually fall into the supply shutter 19 by means of vibration.

(6) The supply shutter 19 is connected to the weighing scale 20. When the weight of the particulate material becomes a predetermined value, the outlet of the supply shutter 19 is opened (not shown), and an accurately weighed amount of particulate material is supplied to a machine in the next process step.

(7) The controller 21 of the particulate material supplying apparatus 1 controls the overall operations of the apparatus 1, including the dispensing operation of the discharge gutter 14, the transport operation of the feeder 18, the weighing operation of the weighing scale 20, and the feeding operation of the supply shutter 19. Various settings, instructions, and display items are input to and output from the controller 21 through the operation panel 22.

Figure 3:
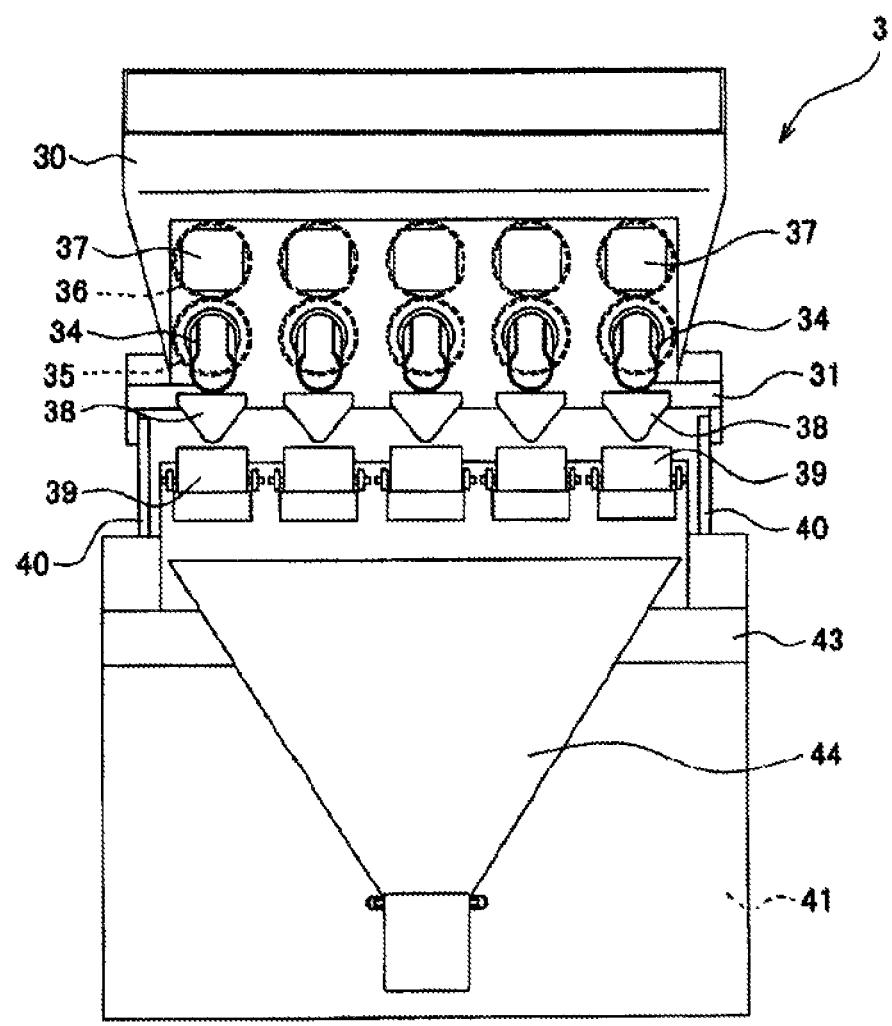
FIG. 3 is a front view of a multi-row particulate material supplying apparatus according to an embodiment of the present invention.
Figure 4:
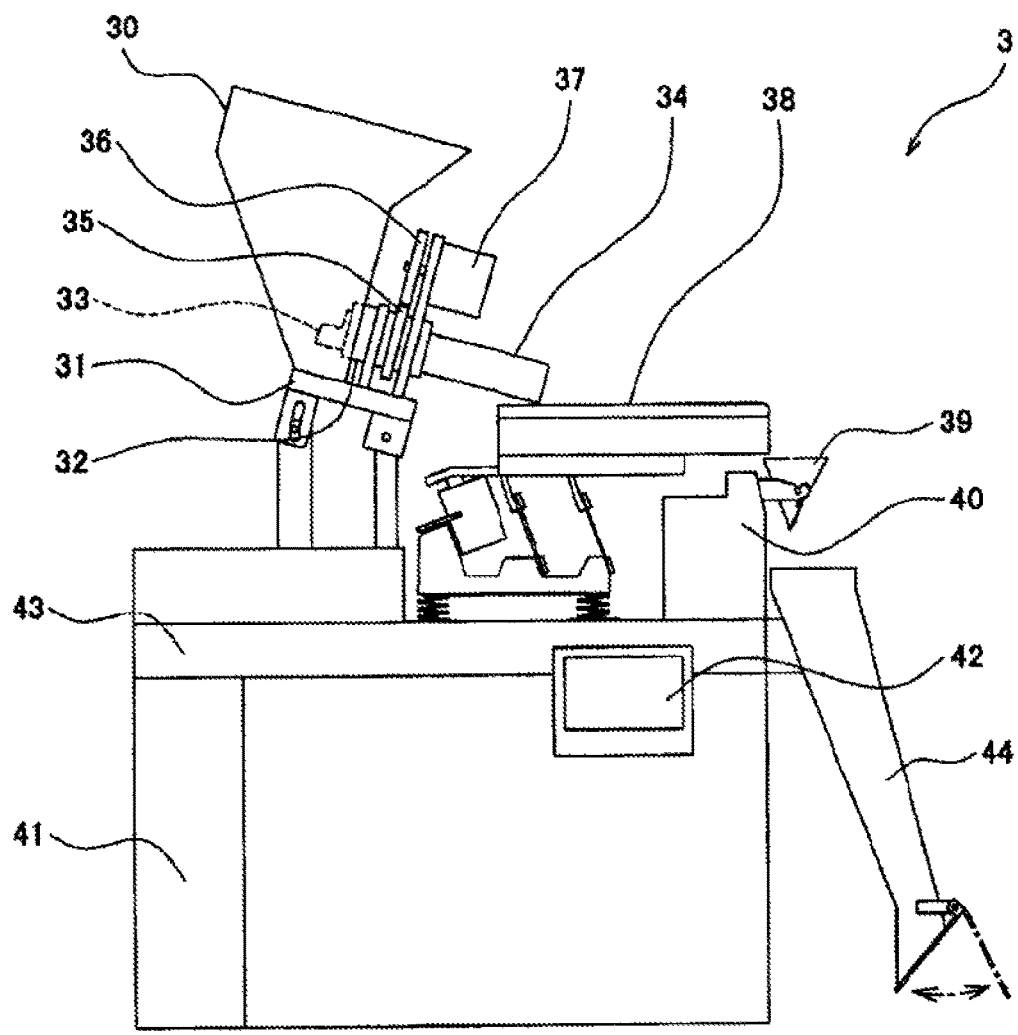
FIG. 4 is a left side view of the multi-row particulate material supplying apparatus.

Next, the structure of a multi-row particulate material supplying apparatus 3 according to an embodiment of the present invention will be described. FIG. 3 is a front view of the multi-row particulate material supplying apparatus 3. FIG. 4 is a left side view of the multi-row particulate material supplying apparatus 3.

Referring to FIGS. 3 and 4, the multi-row particulate material supplying apparatus 3 includes a hopper 30, an inclination adjustment base 31, discharge members 33, and discharge gutters 34. The hopper 30 stores a particulate material composed of irregularly shaped particles. The inclination adjustment base 31 supports the hopper 30 in such a way that the inclination of the hopper 30 is adjustable. The discharge members 33, which are disposed in lower regions inside the hopper 30, first dispense the particulate material in the hopper 30. The discharge gutters 34 move together with the discharge members 33 and transport the particulate material while dispensing the particulate material in the hopper 30.

The discharge gutters 34 include inclined gutter portions each having a substantially U-shaped cross section and having an opening in an upper surface thereof. Base portions of the discharge gutters 34 are connected to the discharge members 33 through connection members 32. Gutter-side transmission gears 35 are fitted onto the discharge gutters 34. Motor-side transmission gears 36 are attached to driving motors 37 that rotate the discharge gutters 34. The transmission gears 35 and 36 mesh with each other.

Feeders 38 are disposed directly below outlets of inclined gutter portions of the discharge gutters 34. The feeders 38 transport the particulate material, which has been received from the discharge gutters 34, by means of vibration while diffusing the particulate material.

Supply shutters 39 are disposed directly below outlets of the feeders 38. The supply shutters 39 are connected to weighing scales 40 so that the weighing scales 40 can weigh the particulate material which has fallen into the supply shutters 39.

A collective shutter 44 is disposed directly below outlets of the supply shutters 39. The collective shutter 44 receives the particulate material from each of the supply shutters 39 and collectively feeds the particulate material to the next process step at a predetermined timing.

The members described above are mounted on a base 43. A controller 41 and an operation panel 42 are disposed under the base 43. The controller 41 performs various control operations of the particulate material supplying apparatus 3. The operation panel 42 is used to perform various input/output operations on the controller 41.

An operation of the multi-row particulate material supplying apparatus 3, which is illustrated in FIGS. 3 and 4, will be described.

(1) A particulate material composed of irregularly shaped particles is stored in the hopper 30. The particulate material in the hopper 30 is compressed in a lower region inside the hopper 30 due to gravity.

(2) The motion of the discharge gutters 34 will be described. The gutter-side transmission gears 35 are fitted onto the discharge gutters 34. The motor-side transmission gears 36 mesh with the gutter-side transmission gears 35, so that the rotational forces of the driving motors 37 are transmitted to the discharge gutters 34. When the driving motors 37 rotate leftward in FIG. 3, the discharge gutters 34 rotate rightward (hereinafter referred to as "forward"). When the driving motors 37 rotate rightward, the discharge gutters 34 rotate leftward (hereinafter referred to as "backward"). Under the control of the controller 41, the driving motors 37 rotate leftward to a predetermined angle, then rotate rightward to a predetermined angle, and repeat the leftward and rightward rotations. Likewise, the discharge gutters 34, which are connected to the driving motors 37 through gears, rotate forward to a predetermined angle, then rotate backward to a predetermined angle, and repeat the forward and backward rotations. Thus, the discharge gutters 34 each perform a swinging motion. As a result, when the discharge gutters 34 swing by switching the rotation direction, a horizontal stirring force at an angle of 90 degrees with respect to the transport direction is applied to the material, and therefore the particles of a particulate material that tend to cluster together or become entangled are separated from each other and sufficiently loosened.

(3) Because the inclined gutter portions of the discharge gutters 34 each have an opening in the upper surface and has a substantially U-shaped cross section, the rightward (forward) and leftward (backward) rotation angles of the discharge gutters 34 are set in a range such that the particulate material does not fall out from the openings. In addition to the rotation angles of the discharge gutters 34, the rotational speeds of the discharge gutters 34 in the forward and backward directions and the inclination angles of the discharge gutters 34, which are adjusted using the inclination adjustment base 31, are factors that determine the loosening effect to the swinging motion. That is, the larger the rotation angles of the discharge gutters 34 and higher the rotational speeds of the discharge gutters 34, the more the particles of the particulate material are loosened. The smaller the inclination angles of the discharge gutters 34, the more the particles of the particulate material are loosened, because the number of swings increases although the transportation amount of the particulate material decreases.

(4) As the discharge gutters 34 move, the discharge members 33, which are connected to the discharge gutters 34 through the connection members 32, each perform a swinging motion in the hopper 30. Thus, the particulate material in the hopper 30 is dispensed to the discharge gutters 34. As the discharge gutters 34 each perform a swinging motion as described above in (2) and (3), the particles of the particulate material dispensed to the discharge gutters 34 are sufficiently loosened. After the particles have been separated from each other, the particulate material is supplied to the feeders 38.

(5) The feeders 38 further diffuse the particulate material received from the discharge gutters 34 and cause the particulate material to gradually fall into the supply shutters 39 by means of vibration.

(6) The supply shutters 39 are connected to the weighing scales 40. The weighing scales 40 continue weighing the particulate material until the weights of the particulate material reach predetermined reference values. After the weights of the particulate material have reached the reference values, at release timings determined for the supply shutters 39, the outlets of the supply shutters 39 are opened and the weighed particulate material is supplied to the collective shutter 44.

(7) At a predetermined feed timing after the total weight of the particulate material supplied to the collective shutter 44 from the supply shutters 39 has reached a predetermined weight to be fed into a packaging bag, the collective shutter 44 collectively feeds the particulate material, which has been accurately weighed, to a machine in the next process step.

(8) The controller 41 of the particulate material supplying apparatus 3 controls the overall operations of the apparatus 3, including the dispensing operations of the discharge gutters 34, the transport operations of the feeders 38, the weighing operations of the weighing scales 40, the feeding operations of the supply shutters 39, and the collective feeding operation of the collective shutter 44. Various settings, instructions, and display items are input to and output from the controller 41 through the operation panel 42.

(9) The multi-row particulate material supplying apparatus 3 illustrated in FIGS. 3 and 4 feeds the particulate material in the amount that is the sum of the particulate material discharged from the plural discharge gutters 34, so that the time required for the amount of the particulate material to reach a predetermined amount needed in the next process step is considerably reduced.

That is, the multi-row particulate material supplying apparatus 3 can supply the particulate material in the amount needed in the next process step within a time that is a fraction of that of the single-row particulate material supplying apparatus 1. Therefore, the multi-row particulate material supplying apparatus 3 can be connected to a latest-type automatic packaging machine that operates at a high speed.

Here, a loosening function of the discharge gutter 34 will be described in details.

Figure 5:
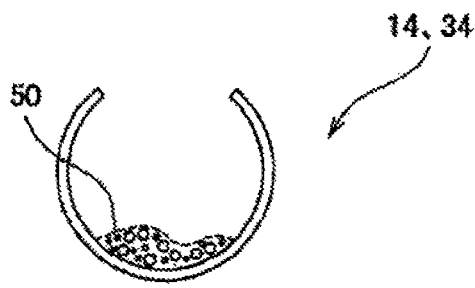
FIG. 5 is a schematic sectional view of a discharge gutter of a particulate material supplying apparatus according to an embodiment of the present invention in a home position (initial state)
Figure 6:
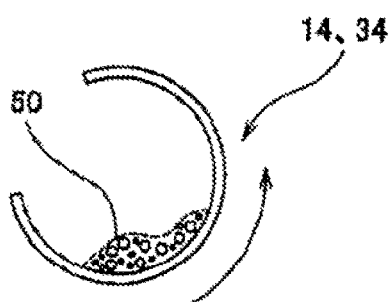
FIG. 6 is a schematic sectional view of the discharge gutter of the particulate material supplying apparatus in a rightward (forward) rotated position.
Figure 7:
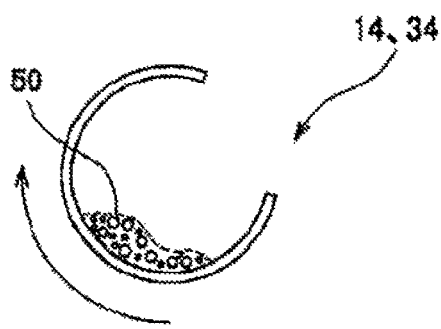
FIG. 7 is a schematic sectional view of the discharge gutter of the particulate material supplying apparatus in a leftward (backward) rotated position.

FIG. 5 is a schematic sectional view of the discharge gutter 14 or 34 of the particulate material supplying apparatus 1 or 3 according to an embodiment of the present invention in a home position (initial state). FIG. 6 is a schematic sectional view of the discharge gutter 14 or 34 of the particulate material supplying apparatus 1 or 3 in a rightward (forward) rotated position. FIG. 7 is a schematic sectional view of the discharge gutter 14 or 34 of the particulate material supplying apparatus 1 or 3 in a leftward (backward) rotated position.

As illustrated in FIG. 5, a particulate material 50 has been dispensed in the discharge gutter 14 or 34 in the home position (initial state) before performing a swinging motion. At this time, the particles of the particulate material, which have just been dispensed, are partially clustered or entangled.

Next, as illustrated in FIG. 6, the discharge gutter 14 or 34 is rotated rightward (forward) to a predetermined angle by the driving motor 17 or 37, which is connected to the discharge gutter 14 or 34 through gears. At this time, a horizontal stirring force at an angle of 90 degrees with respect to the transport direction of the discharge gutter 14 or 34 is applied to the particulate material 50 in the discharge gutter 14 or 34.

Next, as illustrated in FIG. 7, the discharge gutter 14 or 34 is rotated leftward (backward) to a predetermined angle by the driving motor 17 or 37, which is connected to the discharge gutter 14 or 34 through gears. At this time, a horizontal stirring force at an angle of 90 degrees with respect to the transport direction of the discharge gutter 14 or 34 is applied to the particulate material 50 in the discharge gutter 14 or 34.

As the forward and backward rotations are repeated, the discharge gutter 14 or 34 performs a swinging motion. Every time the discharge gutter 14 or 34 changes the rotation direction during the swinging motion, a horizontal stirring force at an angle of 90 degrees with respect to the transport direction is applied to the transported particulate material 50. As a result, the particles of the particulate material 50, which tend to cluster together or become entangled, are separated from each other and sufficiently loosened.

Examples of the particulate material 50 include seaweed flakes, tea leaves, ingredients of processed foods (dried meat, dried vegetable), toppings for boiled rice, and seeds of plants, particulate snack foods, drugs, and screws. In accordance with the characteristics of such particulate materials, the controller 21 or 41 of the particulate material supplying apparatuses 1 or 3 controls the swinging motion of the discharge gutter 14 or 34 by appropriately and freely changing the rotation angle and the rotational speed of the discharge gutter 14 or 34.

The swinging motion may be controlled by changing the rotation angle and the rotational speed during the swinging motion, instead of setting the rotation angle and the rotational speed at constant values. In the case where the rotation angle and the rotational speed are changed during the swinging motion, a stirring force applied to the particulate material varies, so that the particles of the particulate material can be loosened in a more complex way.

Figure 8:
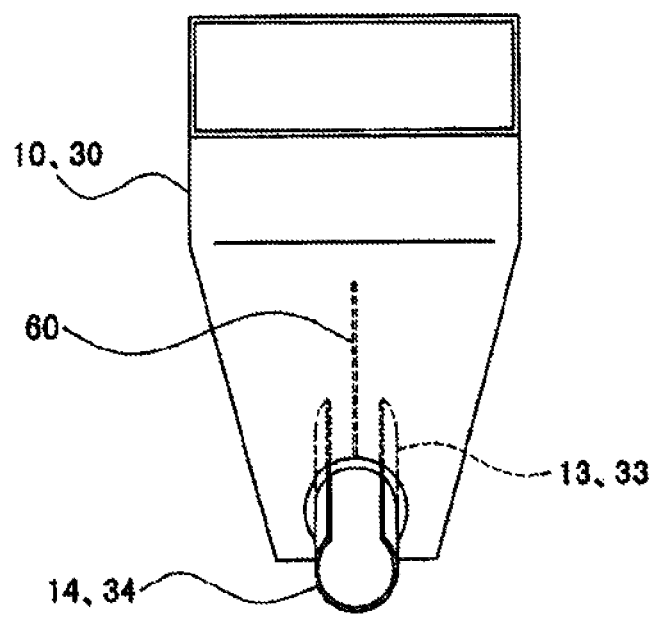
FIG. 8 is a schematic front view illustrating a discharge member, provided with a stirring bar, of the discharge gutter of the particulate material supplying apparatus according to an embodiment of the present invention in a home position (initial state)

FIG. 8 is a schematic front view illustrating the discharge member 13 or 33, provided with a stirring bar 60, of the discharge gutter 14 or 34 of the particulate material supplying apparatus 1 or 3 in the home position (initial state).

Figure 9:
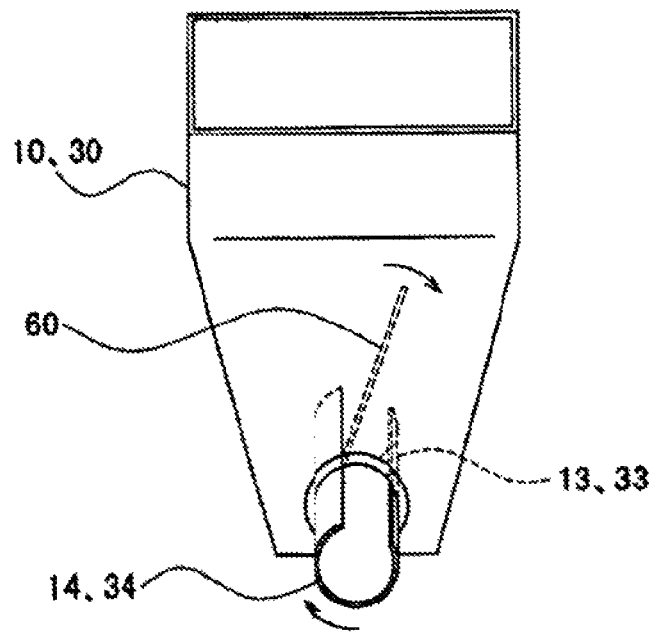
FIG. 9 is a schematic front view illustrating the discharge member, provided with the stirring bar, of the discharge gutter in a rightward (forward) rotated position.

FIG. 9 is a schematic front view illustrating the discharge member 13 or 33, provided with the stirring bar 60, of the discharge gutter 14 or 34 of the particulate material supplying apparatus 1 or 3 in a rightward (forward) rotated position.

FIG. 8 illustrates the discharge gutter 14 or 34 in the home position (initial state) before performing a swinging motion. The discharge member 13 or 33, which is disposed in a lower region inside the hopper 10 or 30, is attached to the discharge gutter 14 or 34. The discharge member 13 or 33 performs a swinging motion in the hopper 10 or 30 so as to dispense the particulate material in the hopper 10 or 30 to the discharge gutter 14 or 34. In the example illustrated in FIG. 8, the discharge member 13 or 33 is provided with the stirring bar 60 that stirs the particulate material in corporation with the swinging motion of the hopper 10 or 30.

As illustrated in FIG. 9, when the discharge member 13 or 33, which is disposed in the hopper 10 or 30, rotates rightward (forward) due to the swinging motion, the stirring bar 60, which is attached to the hopper 10 or 30, also rotates rightward (forward) to a predetermined angle. As a result, the stirring bar 60 actively stirs the particulate material in the hopper 10 or 30, so that a larger amount of particulate material is dispensed from the hopper 10 or 30 to the discharge gutter 14 or 34.

FIG. 10 is a schematic side view of the particulate material supplying apparatus 1 or 3, further including a material regulation bar 70 disposed in the discharge gutter 14 or 34. As illustrated in FIG. 10, in the discharge gutter 14 or 34, the particulate material 50, dispensed from the hopper 10 or 30, is transported from the left side to the right side in FIG. 10. The particulate material 50 is transported due to the inclination of the discharge gutter 14 or 34 (as illustrated in FIG. 10) and the swinging motion of the discharge gutter 14 or 34.

In a case where the particles of the particulate material 50 have a property of easily clustering together or becoming entangled, the particles of the particulate material 50 might not be sufficiently loosened only by the swinging motion of the discharge gutter 14 or 34. Therefore, as illustrated in FIG. 10, the material regulation bar 70, which is supported by the base of the particulate material supplying apparatus 1 or 3, is inserted through the opening in the upper surface of the inclined gutter portion of the discharge gutter 14 or 34. The material regulation bar 70 levels off the particulate material 50 in the discharge gutter 14 or 34 and stirs the particulate material 50.

As the material regulation bar 70 levels off the particulate material 50 moving along the discharge gutter 14 or 34, the particulate material 50 becomes a particulate material 51, which has a uniform height. Accordingly, the particles of the particulate material having a property of more easily clustering together or becoming entangled can be loosened more efficiently, and the variation in the amount of the particulate material supplied to the discharge gutter and beyond can be reduced. A base portion of the material regulation bar 70 is attached to a vertical adjuster 71 so that the height of the material regulation bar 70 can be adjusted. With the vertical adjuster 71, the degree to which the particles of the particulate material are loosened and the height of the particulate material 51, which has been leveled off, can be adjusted.

The embodiments are examples for carrying out the present invention. Although there are correspondences between the members of the embodiments and the elements in the claims, the invention is not limited to the embodiments and can be modified in various ways within the spirit and scope of the invention.

Figure 12:
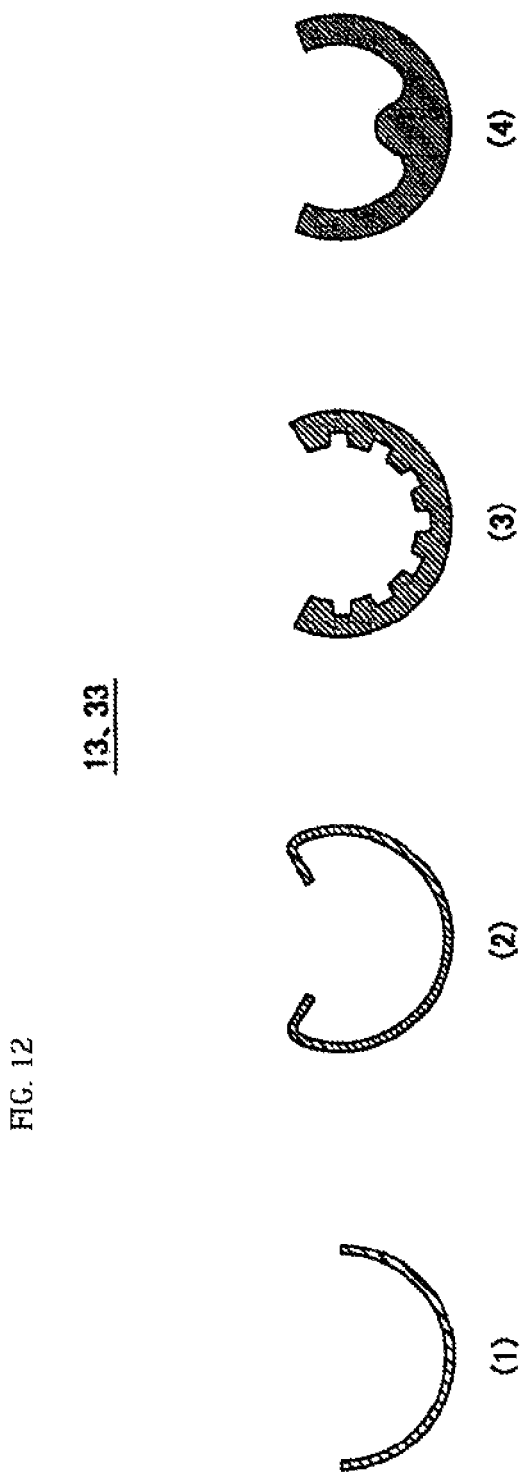
FIG. 12 illustrates examples of the cross-sectional shape of a discharge member according to an embodiment of the present invention.
Figure 13:
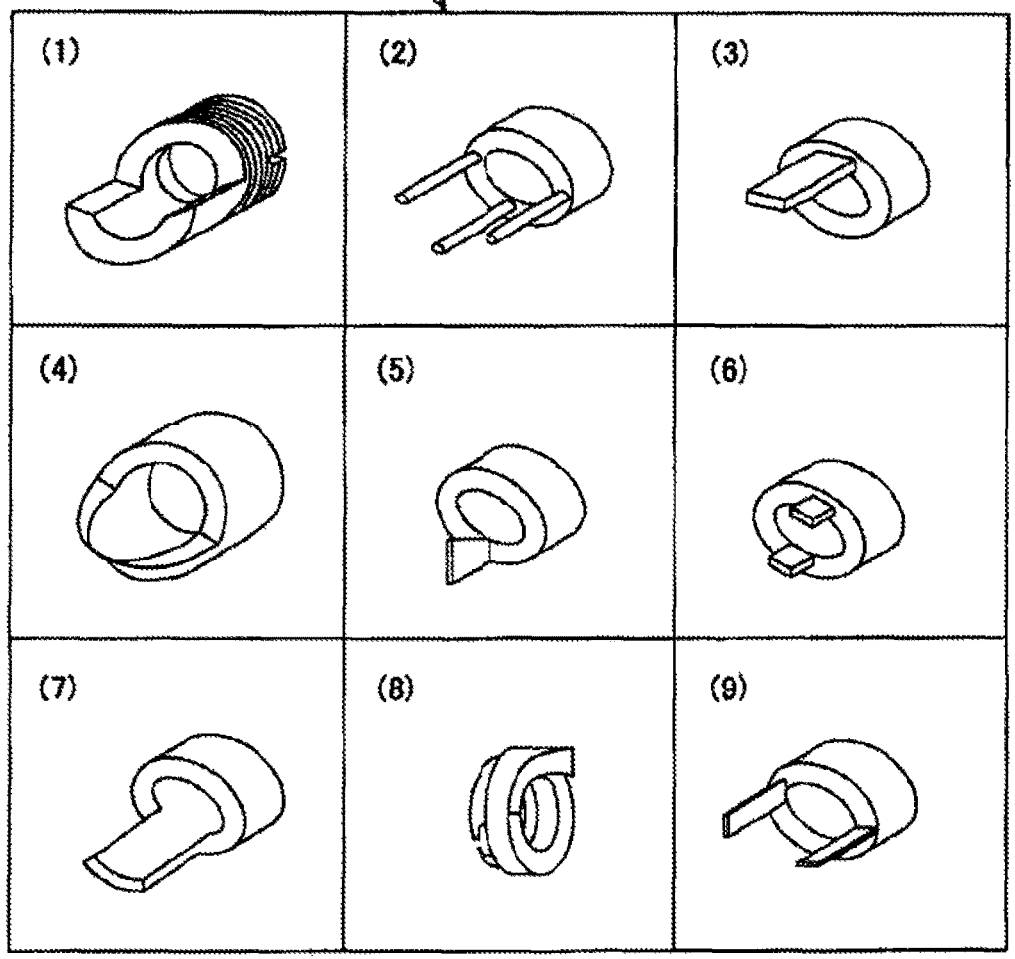
FIG. 13 illustrates examples of the outer shape of a discharge member according to an embodiment of the present invention.

Here, modifications of the discharge member of the particulate material supplying apparatus according to the embodiments of the present invention will be described with reference to the drawings. FIGS. 11A-11C are an enlarged view illustrating the discharge member 13 or 33 and the discharge gutter 14 or 34 of the particulate material supplying apparatus 1 or 3. FIG. 12 illustrates examples (1) to (4) of the cross-sectional shape of the discharge member 13 or 33. FIG. 13 illustrates examples (1) to (9) of the shape of the discharge member 13 or 33. FIGS. 11A-11C illustrate the hopper 10 or 30, in which a particulate material composed of irregularly shaped particles is stored; the discharge member 33, which is disposed in a lower region inside the hopper 10 or 30 and which first dispenses the particulate material in the hopper 10 or 30; and the discharge gutter 14 or 34, which moves together with the discharge member 13 or 33 and transports the particulate material while dispensing the particulate material in the hopper 10 or 30.

The discharge gutter 14 or 34 includes an inclined gutter portion having an opening in the upper surface thereof and having a substantially U-shaped cross section. The discharge gutter 14 or 34 is connected to the discharge member 13 or 33 through the connection member 12 or 32. In FIG. 11B, a sectional view of the discharge member 13 or 33 taken along line 11B-11B is illustrated on the left side of the discharge gutter 14 or 34, and in FIG. 11C a sectional view of the discharge gutter 14, 34 taken along line 11C-11C is illustrated on the right side of the discharge gutter 14 or 34.

FIG. 12 illustrates examples (1) to (4) of the cross-sectional shape of the discharge member 13 or 33. FIG. 13 illustrates examples (1) to (9) of the outer shape of the discharge member 13 or 33.

As illustrated in FIGS. 12 and 13, the shape of the discharge member 13 or 33 may be modified in various ways in accordance with the property of the particulate material. To be specific, in a case where the particles of the particulate material in the hopper have a property of easily clustering together, a discharging member having a protrusion for breaking clusters of the particles is selected. Examples of such discharge members are (2), (3), and (4) in FIG. 12; and (2), (3), (5), (6), (8), and (9) in FIG. 13.

In a case where the particles of the particulate material in the hopper have a property of easily becoming entangled, a discharge member having a simple shape with which entanglement with the particles can be avoided is selected. Examples of such discharge members are (1) FIG. 12; and (1), (4), and (7) in FIG. 13.

Figure 14:
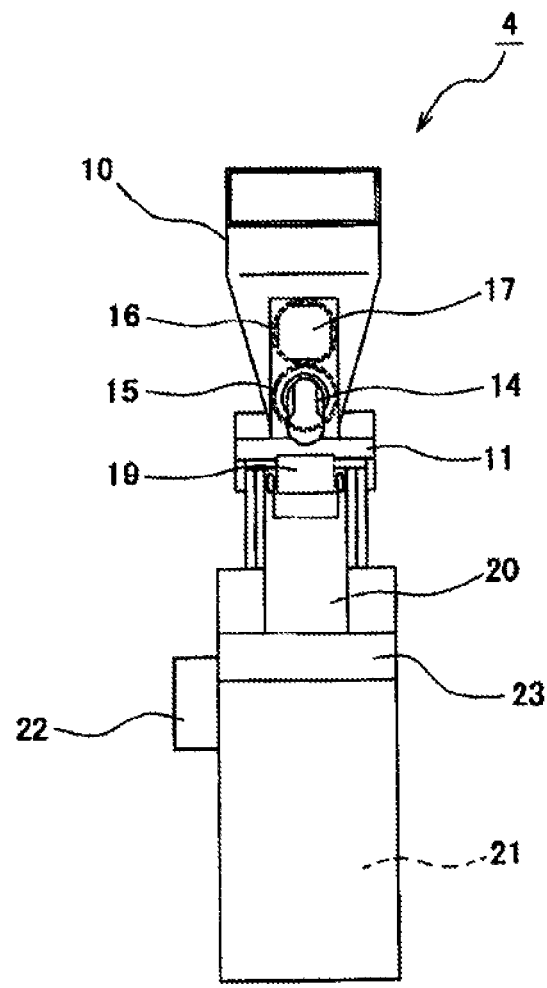
FIG. 14 is a front view of a single-row particulate material supplying apparatus according to another embodiment of the present invention.
Figure 15:
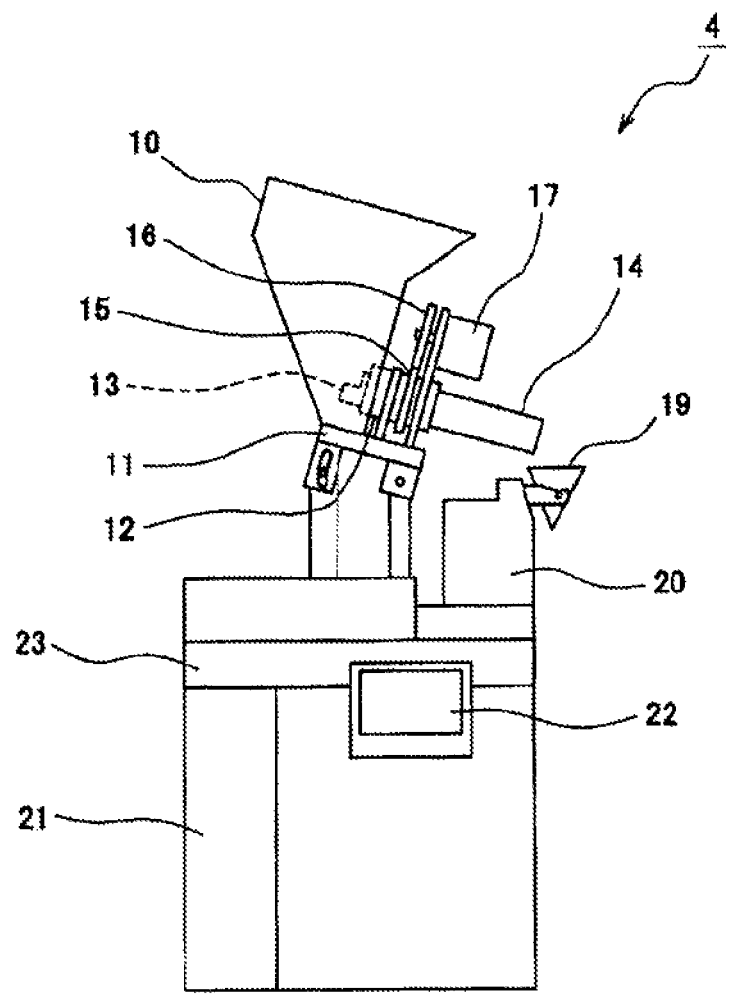
FIG. 15 is a left side view of the single-row particulate material supplying apparatus according to the other embodiment.
Figure 16:
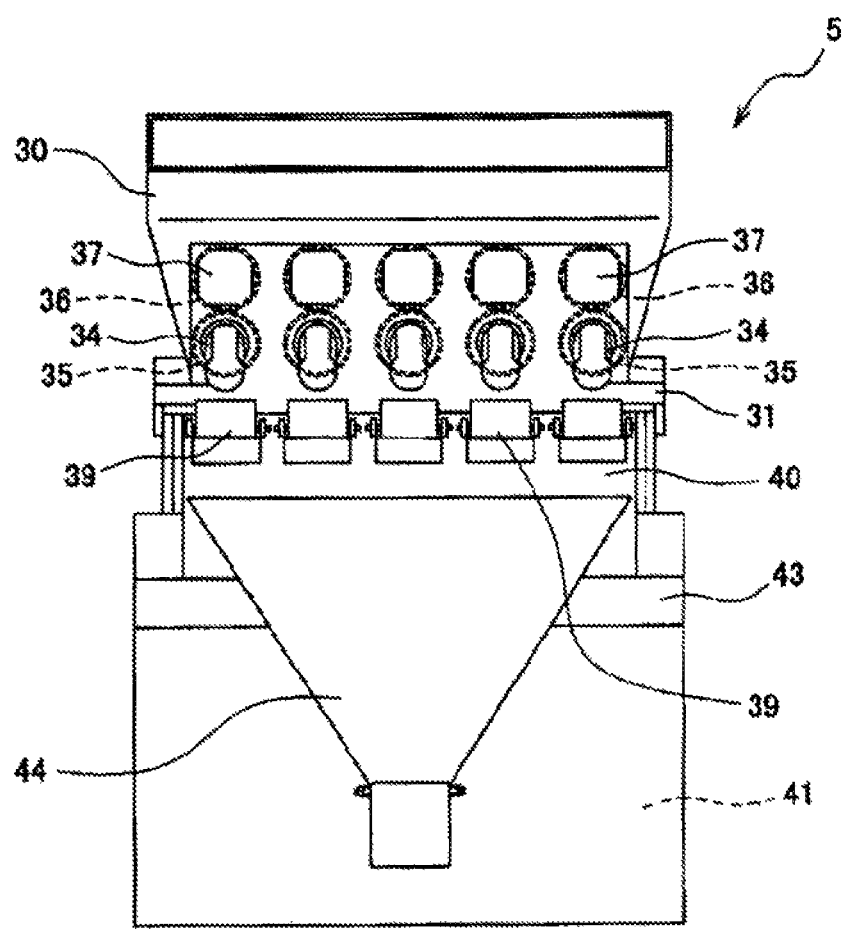
FIG. 16 is a front view of a multi-row particulate material supplying apparatus according to another embodiment of the present invention.
Figure 17:
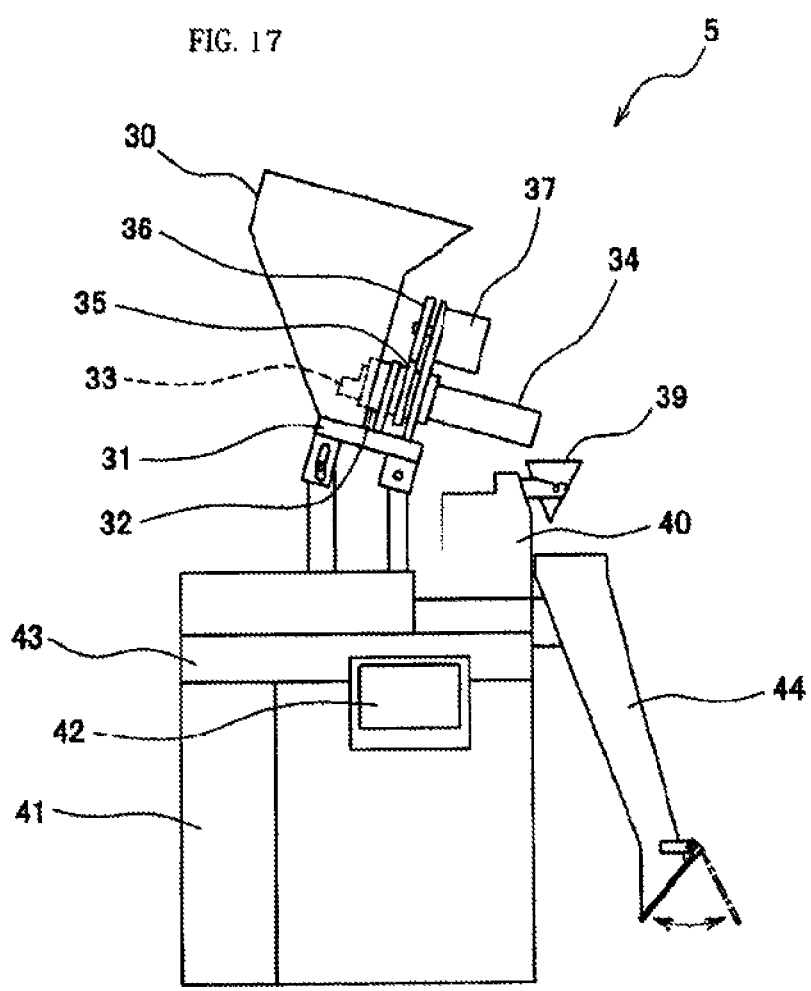
FIG. 17 is a left side view of the multi-row particulate material supplying apparatus according to the other embodiment.

Next, particulate material supplying apparatuses according to other embodiments of the present invention will be described with reference to the drawings. FIG. 14 is a front view of a single-row particulate material supplying apparatus 4 according to another embodiment of the present invention. FIG. 15 is a left side view of the single-row particulate material supplying apparatus 4. FIG. 16 is a front view of a multi-row particulate material supplying apparatus 5 according to another embodiment of the present invention. FIG. 17 is a left side view of the multi-row particulate material supplying apparatus 5.

As illustrated in FIGS. 14 and 15, the single-row particulate material supplying apparatus 4 does not include the feeder 18, which is included in the single-row particulate material supplying apparatus 1 illustrated in FIGS. 1 and 2. Other components of the apparatus 4 are the same as those of the apparatus 1 illustrated in FIGS. 1 and 2. The single-row particulate material supplying apparatus 4 includes a hopper 10, an inclination adjustment base 11, a discharge member 13, and a discharge gutter 14. The hopper 10 stores a particulate material composed of irregularly shaped particles. The inclination adjustment base 11 supports the hopper 10 in such a way that the inclination of the hopper 10 is adjustable. The discharge member 13 (not illustrated in FIG. 14, see FIG. 15), which is disposed in a lower region inside the hopper 10, first dispenses the particulate material in the hopper 10. The discharge gutter 14 moves together with the discharge member 13 and transports the particulate material while dispensing the particulate material in the hopper 10.

The discharge gutter 14 includes an inclined gutter portion having a substantially U-shaped cross section and having an opening in an upper surface thereof. The discharge gutter 14 is connected to the discharge member 13 through a connection member 12. A gutter-side transmission gear 15 is fitted onto the discharge gutter 14. A motor-side transmission gear 16 is attached to a driving motor 17 that rotates the discharge gutter 14 to a predetermined angle. The transmission gears 15 and 16 mesh with each other.

A supply shutter 19 is disposed directly below an outlet of the inclined gutter portion of the discharge gutter 14. The supply shutter 19 is connected to the weighing scale 20 so that the weighing scale 20 can weigh the particulate material which has fallen into the supply shutter 19. The members described above are mounted on a base 23. A controller 21 and an operation panel 22 are disposed under the base 23. The controller 21 performs various control operations of the particulate material supplying apparatus 4. The operation panel 22 is used to perform various input/output operations on the controller 21.

An operation of the single-row particulate material supplying apparatus 4, which is illustrated in FIGS. 14 and 15, will be described. Except for the motion of the feeder 18, the members of the single-row particulate material supplying apparatus 4 move in the same way those of the apparatus 1 illustrated in FIGS. 1 and 2.

(1) A particulate material composed of irregularly shaped particles (not shown) is stored in the hopper 10. The particulate material in the hopper 10 is compressed in a lower region inside the hopper 10 due to gravity.

(2) The motion of the discharge gutter 14 will be described. The gutter-side transmission gear 15 (described above) is fitted onto a base portion of the discharge gutter 14. The motor-side transmission gear 16 meshes with the gutter-side transmission gear 15, so that the rotational force of the driving motor 17 is transmitted to the discharge gutter 14. When the driving motor 17 rotates the motor-side transmission gear 16 leftward (counterclockwise) in FIG. 1, the gutter-side transmission gear 15 rotates the discharge gutter 14 rightward (clockwise) (hereinafter referred to as "forward"). When the driving motor 17 rotates the motor-side transmission gear 16 rightward, the gutter-side transmission gear 15 rotates the discharge gutter 14 leftward (hereinafter referred to as "backward"). Under the control of the controller 21, the driving motor 17 rotates leftward to a predetermined angle, then rotates rightward to a predetermined angle, and repeats the forward and backward rotations. Likewise, the discharge gutter 14, which is connected to the driving motor 17 through gears, rotates forward to a predetermined angle, then rotates backward to a predetermined angle, and repeats the forward and backward rotations. Thus, the discharge gutter 14 performs a swinging motion. As a result, when the discharge gutter 14 swings by switching its rotation direction, a horizontal stirring force at an angle of 90 degrees with respect to the transport direction is applied to the material, and therefore the particles of a particulate material that tend to cluster together or become entangled are separated from each other and sufficiently loosened.

(3) Because the inclined gutter portion of the discharge gutter 14 has an opening in the upper surface and has a substantially U-shaped cross section, the rightward (forward) and leftward (backward) rotation angles of the discharge gutter 14 are set in a range such that the particulate material does not fall out from the opening. In addition to the rotation angle of the discharge gutter 14, the rotational speeds of the discharge gutter 14 in the forward and backward directions and the inclination angle of the discharge gutter 14, which is adjusted using the inclination adjustment base 11, are factors that determine the loosening effect to the swinging motion. That is, the larger the rotation angle of the discharge gutter 14 and higher the rotational speed of the discharge gutter 14, the more the particles of the particulate material are loosened. The smaller the inclination angle of the discharge gutter 14, the more the particles of the particulate material are loosened, because the number of swings increases although the transportation amount of the particulate material decreases.

(4) As the discharge gutter 14 moves, the discharge member 13, which is connected to the discharge gutter 14 through the connection member 12, performs a swinging motion (forward and backward rotations) in the hopper 10. Thus, the particulate material in the hopper 10 is dispensed to the discharge gutter 14. As the discharge gutter 14 performs a swinging motion in forward and backward directions as described above in (2) and (3), the particles of the particulate material dispensed to the discharge gutter 14 are sufficiently loosened. After the particles have been separated from each other, the particulate material gradually falls into the supply shutter 19.

(5) The supply shutter 19 is connected to the weighing scale 20. When the weight of the particulate material becomes a predetermined value, the outlet of the supply shutter 19 is opened (not shown), and an accurately weighed amount of particulate material is supplied to a machine in the next process step.

(6) The controller 21 of the particulate material supplying apparatus 1 controls the overall operations of the apparatus 1, including the dispensing operation of the discharge gutter 14, the weighing operation of the weighing scale 20, and the feeding operation of the supply shutter 19. Various settings, instructions, and display items are input to and output from the controller 21 through the operation panel 22.

The single-row particulate material supplying apparatus 4 loosens the particles of the particulate material to a smaller degree, because the feeder 18 illustrated in FIGS. 1 and 2 is omitted. Therefore, the single-row particulate material supplying apparatus 4 may be used for a particulate material whose particles are less sticky and can be easily separated from each other by only the swinging motion of the discharge gutter 14. Because the feeder 18 illustrated in FIGS. 1 and 2 is omitted, the single-row particulate material supplying apparatus 4 can be reduced in size and cost.

Next, as illustrated in FIGS. 16 and 17, the multi-row particulate material supplying apparatus 5 does not include the feeders 38, which are included in the multi-row particulate material supplying apparatus 3 illustrated in FIGS. 3 and 4. Other components of the apparatus 5 are the same as those of the apparatus 3 illustrated in FIGS. 3 and 4. The multi-row particulate material supplying apparatus 5 includes a hopper 30, an inclination adjustment base 31, discharge members 33, and discharge gutters 34. The hopper 30 stores a particulate material composed of irregularly shaped particles. The inclination adjustment base 31 supports the hopper 30 in such a way that the inclination of the hopper 30 is adjustable. The discharge members 33, which are disposed in lower regions inside the hopper 30, first dispense the particulate material in the hopper 30. The discharge gutters 34 move together with the discharge members 33 and transport the particulate material while dispensing the particulate material in the hopper 30.

The discharge gutters 34 include inclined gutter portions each having a substantially U-shaped cross section and having an opening in an upper surface thereof. Base portions of the discharge gutters 34 are connected to the discharge members 33 through connection members 32. Gutter-side transmission gears 35 are fitted onto the discharge gutters 34. Motor-side transmission gears 36 are attached to driving motors 37 that rotate the discharge gutters 34. The transmission gears 35 and 36 mesh with each other.

Supply shutters 39 are disposed directly below outlets of the inclined gutter portions of the discharge gutters 34. The supply shutters 39 are connected to weighing scales 40 so that the weighing scales 40 can weigh the particulate material which has fallen into the supply shutters 39.

A collective shutter 44 is disposed directly below the outlets of the supply shutters 39. The collective shutter 44 receives the particulate material from each of the supply shutters 39 and collectively feeds the particulate material to the next process step at a predetermined timing.

The members described above are mounted on a base 43. A controller 41 and an operation panel 42 are disposed under the base 43. The controller 41 performs various control operations of the particulate material supplying apparatus 5. The operation panel 42 is used to perform various input/output operations on the controller 41.

An operation of the multi-row particulate material supplying apparatus 5, which is illustrated in FIGS. 16 and 17, will be described. Except for the motion of the feeders 38, the members of the multi-row particulate material supplying apparatus 5 according to the embodiment of the present invention move in the same way those of the apparatus 3 illustrated in FIGS. 3 and 4.

(1) A particulate material composed of irregularly shaped particles is stored in the hopper 30. The particulate material in the hopper 30 is compressed in a lower region inside the hopper 30 due to gravity.

(2) The motion of the discharge gutters 34 will be described. The gutter-side transmission gears 35 are fitted onto the discharge gutters 34. The motor-side transmission gears 36 mesh with the gutter-side transmission gears 35, so that the rotational forces of the driving motors 37 are transmitted to the discharge gutters 34. When the driving motors 37 rotate leftward in FIG. 16, the discharge gutters 34 rotate rightward (hereinafter referred to as "forward"). When the driving motors 37 rotate rightward, the discharge gutters 34 rotate leftward (hereinafter referred to as "backward"). Under the control of the controller 41, the driving motors 37 rotate leftward to a predetermined angle, then rotate rightward to a predetermined angle, and repeat the forward and backward rotations. Likewise, the discharge gutters 34, which are connected to the driving motors 37 through gears, rotate forward to a predetermined angle, then rotate backward to a predetermined angle, and repeat the forward and backward rotations. Thus, the discharge gutters 34 each perform a swinging motion. As a result, when the discharge gutters 34 swing by switching the rotation direction, a horizontal stirring force at an angle of 90 degrees with respect to the transport direction is applied to the material, and therefore the particles of a particulate material that tend to cluster together or become entangled are separated from each other and sufficiently loosened.

(3) Because the inclined gutter portions of the discharge gutters 34 each have an opening in the upper surface and has a substantially U-shaped cross section, the rightward (forward) and leftward (backward) rotation angles of the discharge gutters 34 are set in a range such that the particulate material does not fall out from the openings. In addition to the rotation angles of the discharge gutters 34, the rotational speeds of the discharge gutters 34 in the forward and backward directions and the inclination angles of the discharge gutters 34, which are adjusted using the inclination adjustment base 31, are factors that determine the loosening effect to the swinging motion. That is, the larger the rotation angles of the discharge gutters 34 and higher the rotational speeds of the discharge gutters 34, the more the particles of the particulate material are loosened. The smaller the inclination angles of the discharge gutters 34, the more the particles of the particulate material are loosened, because the number of swings increases although the transportation amount of the particulate material decreases.

(4) As the discharge gutters 34 move, the discharge members 33, which are connected to the discharge gutters 34 through the connection members 32, each perform a swinging motion in the hopper 30. Thus, the particulate material in the hopper 30 is dispensed to the discharge gutters 34. As the discharge gutters 34 each perform a swinging motion as described above in (2) and (3), the particles of the particulate material dispensed to the discharge gutters 34 are sufficiently loosened. After the particles have been separated from each other, the particulate material gradually falls into the supply shutters 39 due to a vibration effect.

(5) The supply shutters 39 are connected to the weighing scales 40. The weighing scales 40 continue weighing the particulate material until the weights of the particulate material reach predetermined reference values. After the weights of the particulate material have reached the reference values, at release timings determined for the supply shutters 39, the outlets of the supply shutters 39 are opened and the weighed particulate material is supplied to the collective shutter 44.

(6) At a predetermined feed timing after the total weight of the particulate material supplied to the collective shutter 44 from the supply shutters 39 has reached a predetermined weight to be fed into a packaging bag, the collective shutter 44 collectively feeds the particulate material that has been accurately weighed to a machine in the next process step.

(7) The controller 41 of the particulate material supplying apparatus 5 controls the overall operations of the apparatus 5, including the dispensing operations of the discharge gutters 34, the weighing operations of the weighing scales 40, the feeding operations of the supply shutters 39, and the collective feeding operation of the collective shutter 44. Various settings, instructions, and display items are input to and output from the controller 41 through the operation panel 42.

(8) The multi-row particulate material supplying apparatus 5 illustrated in FIGS. 16 and 17 feeds the particulate material in the amount that is the sum of the particulate material discharged from the plural discharge gutters 34, so that the time required for the amount of the particulate material to reach a predetermined amount needed in the next process step is considerably reduced.

That is, the multi-row particulate material supplying apparatus 5 can supply the particulate material in the amount needed in the next process step within a time that is a fraction of that of the single-row particulate material supplying apparatus 4. Therefore, the multi-row particulate material supplying apparatus 5 can be connected to a latest-type automatic packaging machine that operates at a high speed.

The multi-row particulate material supplying apparatus 5 loosens the particles of the particulate material to a smaller degree, because the feeders 38 illustrated in FIGS. 3 and 4 are omitted. Therefore, the multi-row particulate material supplying apparatus 5 may be used for a particulate material whose particles are less sticky and can be easily separate from each other by only the swinging motion of the discharge gutters 34. Because the feeders 38 illustrated in FIGS. 3 and 4 are omitted, the multi-row particulate material supplying apparatus 5 can be reduced in size and cost.

A portion of the feeder 18 or 38 illustrated in FIGS. 1 to 4 that receives the particulate material fallen from the discharge gutter 14 or 34 will be referred to as a "trough". The trough has a gutter-like shape having a substantially V-shaped cross section. A bottom portion of the trough, which extends linearly, has a function of loosening the particles of the particulate material fallen from the discharge gutter 14 or 34 while transporting the particulate material at a constant speed.

In addition, the trough has a function of arranging the particles of the loosened particulate material on the bottom portion of the trough so that the particles of the particulate material that have been separated from each other can regularly fall onto a device in the next step (the supply shutter 19 or 39 in FIGS. 1 to 4) from the outlet of the trough. If there were gaps between the particles of the particulate material arranged on the bottom portion of the trough and the particles fall from the outlet of the trough, the following problems would occur. That is, when weighing the particulate material using a device in the next step (the supply shutter 19 or 39 in FIGS. 1 to 4), an idle time occurs due to the presence of the gaps and the time required for weighing varies. As a result, an error in the measured weight may occur or the weighing speed of the particulate material supplying apparatus may decrease.

In the particulate material supplying apparatus 1 or 3, the length of the inclined gutter portion of the discharge gutter 14 or 34 or the length of the trough of the feeder 18 or 38 is made sufficiently large, so that the particles of the particulate material, which have been separated from each other, can be arranged without gaps therebetween and the particles can smoothly and continuously fall into the supply shutter 19 or 39 that is used to weigh the particulate material.

However, such an increase in the length of the gutter portion of the discharge gutter 14 or 34 or the length of the trough of the feeder 18 or 38 may cause a problem of an increase in the size or cost of the particulate material supplying apparatus.

In order to prevent this, in the particulate material supplying apparatus according to the present invention, the length of the trough of the feeder 18 or 38 is not increased. Instead, a stepped portion is formed on the bottom portion of the trough so that gaps between the particles of the particulate material that have been separated from each other can be substantially eliminated and the particles can be arranged without gaps therebetween.

Figure 18:
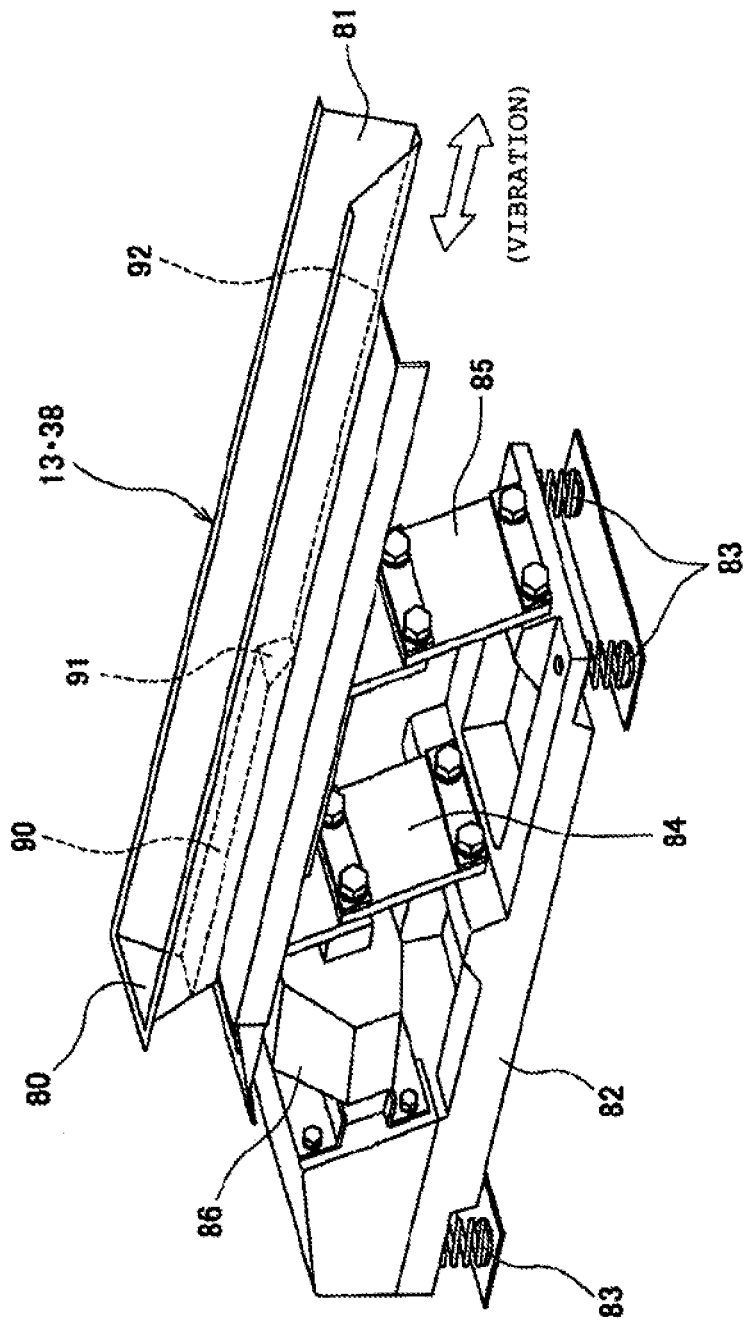
FIG. 18 is a perspective view of a feeder of a particulate material supplying apparatus according to an embodiment of the present invention.

FIG. 18 is a perspective view of the feeder 18 or 38 of a particulate material supplying apparatus according to an embodiment of the present invention.

Figure 19:
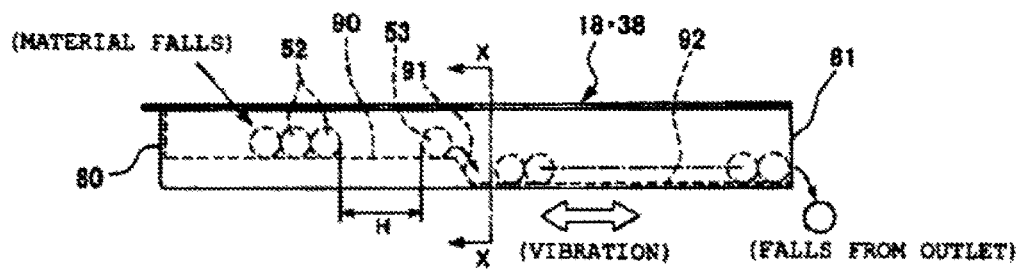
FIGS. 19A to 19D illustrate an operation of the feeder.
Figure 19:
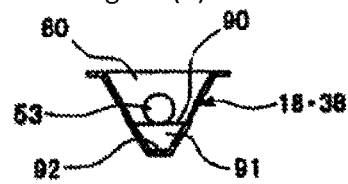
Figure 19:
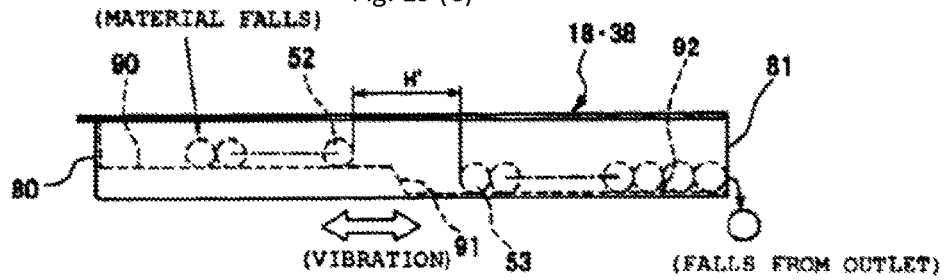
Figure 19:
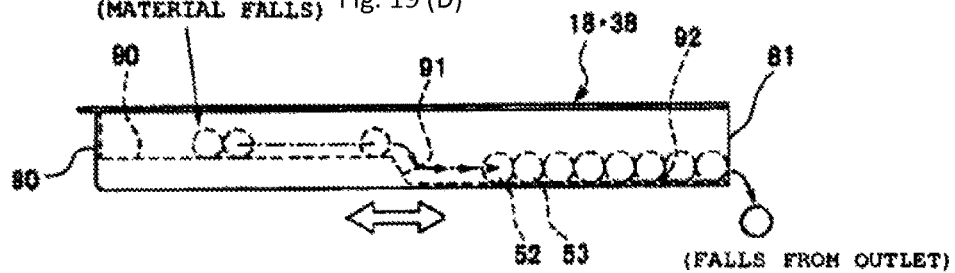

FIGS. 19A to 19C illustrate an operation of the feeder 18 or 38 of a particulate material supplying apparatus. First, the structure of the feeder 18 or 38 of the particulate material supplying apparatus will be described. Referring to FIG. 18, the feeder 18 or 38 of the particulate material supplying apparatus includes a trough 80, a trough outlet 81, a first bottom portion 90, a stepped portion 91, and a second bottom portion 92. The trough 80 receives the particulate material fallen from a discharge gutter. After the particles of the particulate material have been loosened and arranged, the particulate material is fed to a device in the next step (the supply shutter 19 or 39 in FIGS. 1 to 4) through the trough outlet 81. The first bottom portion 90 first receives the particulate material from the discharge gutter. The stepped portion 91 is formed in a transport path of the particulate material along the trough. After the particles of the particulate material have been loosened and arranged, that particles are located on the second bottom portion 92.

The feeder 18 or 38 further includes a base 82, coil springs 83, an electromagnet 86, and plate springs 84 and 85. The base 82 is a base of a vibrator that vibrates the body of the trough in such a way that the particulate material received by the trough is moved in the transport direction. The coil springs 83 absorb vibration of the vibrator so that the body of the particulate material supplying apparatus might not be affected by the vibration. The electromagnet 86 repeats an operation of attracting and releasing the body of the trough so as to move the trough in such a way that the particulate material is moved in the transport direction. The plate springs 84 and 85 connect the trough 80 and the base 82 of the vibrator to each other and, by being warped as the electromagnet 86 repeats the operation of attracting and releasing the body of the trough, contributes to generation of vibration for transporting the particulate material.

As described above, the feeder 18 or 38 includes the trough 80 and the vibrator. The trough 80 receives the particulate material dispensed from a discharge gutter and transports the particulate material. The vibrator provides a means of transporting the particulate material by vibrating the trough 80. The vibrator includes the base 82, the coil springs 83 for absorbing vibration, the plate springs 84 and 85 for contributing to the vibration for transportation, and the electromagnet 86. The trough 80 includes at least one stepped portion 91 that accelerates the particulate material that is being transported along the trough in order to substantially eliminate gaps between the particles of the particulate material, which were generated when the particles were loosened.

Next, the operation of the feeder 18 or 38 will be described.

(1) FIG. 19A illustrates particles 52 and 53 of a particulate material, which have entered the trough 80 from the left end of the trough 80 and are being transported along the upper surface of the first bottom portion 90, seen the left side. As illustrated in FIG. 19A, the vibrator vibrates the trough 80 with a predetermined amplitude. Due to the vibration and the downward inclination of the feeder 18 or 38 in the transport direction, the particles 52 and 53 are moved toward the outlet 81 at a transportation speed that depends on the amplitude of the vibration. Then, the particles 52 and 53 fall from the outlet 81 at the right end of the trough 80 to a device in the next step (the supply shutter 19 or 39 in FIGS. 1 to 4). While the particles 52 and 53 are being transported along the first bottom portion 90 as illustrated in FIG. 19A, there is a gap H between the particles 52 and 53.

(2) FIG. 19B is a cross-sectional view of the trough 80 taken along line X-X of FIG. 19A, illustrating the positional relationship among the trough 80, the first bottom portion 90, the stepped portion 91, the second bottom portion 92, and the particle 53. Referring to FIG. 19B, the particle 52 (not shown) and the particle 53 are moving along the first bottom portion 90 and about to pass the stepped portion 91.

(3) FIG. 19C illustrates the particles 52 and 53 on the trough 80 at a time when only the particle 53 has passed the stepped portion 91, seen from the left side. As illustrated in FIG. 19C, the particle 52 is still located on the first bottom portion 90, and only the particle 53 has passed the stepped portion 91 and moved to the second bottom portion 92. When the particle 53 passed the stepped portion 91, the particle 53 was accelerated in accordance with the inclination angle of the stepped portion 91. As a result, the particle 53 is located at the tail end of the row of particles that are being transported along the second bottom portion 92. In this state, there still remains a gap H' between the particles 52 and 53.

(4) FIG. 19D illustrates the particles 52 and 53 on the trough 80 at a time when both the particles 52 and 53 have passed the stepped portion 91, seen from the left side. As illustrated in FIG. 19D, the particle 52 has passed the stepped portion 91 and is moving along the second bottom portion 92. When the particle 52 passed the stepped portion 91, the particle 52 was accelerated in accordance with the inclination angle of the stepped portion 91. As a result, the particle 52 is in contact with the particle 53 transported along the second bottom portion 92.

In this state, the gap between the particles 52 and 53 has been substantially eliminated, and all the particles of the particulate material on the second bottom portion 92 are regularly arranged without gaps therebetween.

As described above, in the particulate material supplying apparatus according to the present invention, the length of the trough of the feeder 18 or 38 is not increased. Instead, a stepped portion is formed on the bottom portion of the trough so that gaps between the particles of the particulate material that have been separated can be substantially eliminated and the particles can be arranged without gaps therebetween.

What is claimed is:

1. A particulate material supplying apparatus comprising:
    a hopper that stores a particulate material;
    a discharge gutter that extends diagonally downward from a lower region inside the hopper and dispenses the particulate material in the hopper;
    a feeder that transports the dispensed particulate material to a weighing scale;
    the weighing scale that receives and weighs the transported particulate material;
    a supply shutter that receives the weighed particulate material and feeds the particulate material to a machine in a next process step at a predetermined timing; and
    a controller that controls a dispensing operation of the discharge gutter, a transporting operation of the feeder, a weighing operation of the weighing scale, and a feeding operation of the supply shutter,
    wherein the discharge gutter includes an inclined gutter portion having an opening in an upper surface thereof and having a substantially U-shaped cross section, and
    wherein the controller controls the discharge gutter so that the particulate material in the hopper is dispensed to the feeder by causing the discharge gutter to perform a swinging motion in which a forward rotation and a backward rotation each to a predetermined angle are repeated while the opening in the inclined gutter portion faces upward.

2. The particulate material supplying apparatus according to claim 1, further comprising:
    a discharge member that is disposed in the hopper and connected to the discharge gutter and that first dispenses the particulate material,
    wherein the discharge member is provided with a stirring bar that stirs the particulate material in the hopper as the discharge gutter performs the swinging motion.

3. The particulate material supplying apparatus according to claim 1, further comprising:
    a material regulation bar that extends into the inclined gutter portion of the discharge gutter through the opening, the material regulation bar being supported by a base of the particulate material supplying apparatus in such a way that a vertical position thereof is adjustable, wherein the material regulation bar levels off the particulate material in the discharge gutter and stirs the particulate material in the discharge gutter.

4. The particulate material supplying apparatus according to claim 1,
    wherein the feeder includes a trough that receives the dispensed particulate material from the discharge gutter and transports the particulate material and a vibrator that vibrates the trough to provide means for transporting the particulate material, and
    wherein the trough includes at least one stepped portion that accelerates the particulate material that is being transported along the trough.

5. A particulate material supplying apparatus comprising:
    a hopper that stores a particulate material;
    a plurality of discharge gutters that extend diagonally downward from a lower region inside the hopper and dispense the particulate material in the hopper;
    a plurality of feeders that transport the dispensed particulate material to a plurality of weighing scales;
    the plurality of weighing scales that receive and weigh the transported particulate material;
    a plurality of supply shutters that receive the weighed particulate material and feed the particulate material to a collective shutter;
    wherein the collective shutter that receives the particulate material fed from the supply shutters collectively feeds the particulate material to a machine in a next process step at a predetermined timing; and
    a controller that controls dispensing operations of the discharge gutters, transporting operations of the feeders, weighing operations of the weighing scales, feeding operations of the supply shutters, and a collective feeding operation of the collective shutter,
    wherein the discharge gutters each include an inclined gutter portion having an opening in an upper surface thereof and having a substantially U-shaped cross section,
    wherein the controller controls the discharge gutters so that the particulate material in the hopper is dispensed to the feeders by causing each of the discharge gutters to perform a swinging motion in which a forward rotation and a backward rotation each to a predetermined angle are repeated while the openings in the inclined gutter portions face upward,
    wherein the controller controls the weighing scales so that the weighing scales receive the particulate material transported by the feeders and perform the weighing operations until a weight of the transported particulate material reaches a reference value determined for each of the weighing scales,
    wherein the controller controls the supply shutters so that the supply shutters feed the particulate material to the collective shutter at release timings determined for the supply shutters, and
    wherein the controller controls the collective shutter so that the collective shutter collectively feeds the particulate material to the machine in the next process step at a predetermined feed timing after a total weight of the particulate material fed from the supply shutters has reached a predetermined weight of material to be packed into a package bag.

6. The particulate material supplying apparatus according to claim 5, further comprising:

a plurality of discharge members that are disposed in the hopper and each connected to a corresponding one of the discharge gutters and that first dispense the particulate material, wherein each of the discharge members is provided with a stirring bar that stirs the particulate material in the hopper as the corresponding one of the discharge gutters performs the swinging motion.

7. The particulate material supplying apparatus according to claim 5, further comprising:

a plurality of material regulation bars that each extend into the inclined gutter portion of a corresponding one of the discharge gutters through the opening, the material regulation bars being supported by a base of the particulate material supplying apparatus in such a way that vertical positions thereof are adjustable, wherein the material regulation bars level off the particulate material in the discharge gutters and stir the particulate material in the discharge gutters.

8. The particulate material supplying apparatus according to claim 5, wherein each of the feeders includes a trough that receives the dispensed particulate material from a corresponding one of the discharge gutters and transports the particulate material and a vibrator that vibrates the trough to provide means for transporting the particulate material, and wherein the trough includes at least one stepped portion that accelerates the particulate material that is being transported along the trough.

9. A particulate material supplying apparatus comprising:

a hopper that stores a particulate material;

a discharge gutter that extends diagonally downward from a lower region inside the hopper and dispenses the particulate material in the hopper;

a weighing scale that receives and weighs the dispensed particulate material;

a supply shutter that receives the weighed particulate material and feeds the particulate material to a machine in a next process step at a predetermined timing; and a controller that controls a dispensing operation of the discharge gutter, a weighing operation of the weighing scale, and a feeding operation of the supply shutter, wherein the discharge gutter includes an inclined gutter portion having an opening in an upper surface thereof and having a substantially U-shaped cross section, and wherein the controller controls the discharge gutter so that the particulate material in the hopper is dispensed to the weighing scale by causing the discharge gutter to perform a swinging motion in which a forward rotation and a backward rotation each to a predetermined angle are repeated while the opening in the inclined gutter portion faces upward.

* * * * *